UNITED STATES PATENT OFFICE 2,518,058

PRODUCTION OF CARBONATE ESTERS

Alphonse Pechukas, Akron, Ohio, assignor to Pittsburgh Plate Glass Company, Allegheny County, Pa., a corporation of Pennsylvania No Drawing. Application January 2, 1947, Serial No. 719,927

6 Claims. (Cl. 260—463)

This invention relates to novel carbonate esters and to novel methods of preparing carbonate esters.

In accordance with the present invention it has been found that carbonate esters of Beta halo alcohols may be prepared by reacting a haloformate with an epoxide, in which the oxygen atom is linked to adjacent carbon atoms and therefore contains the group

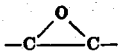

or

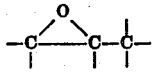

the epoxy carbon atoms being linked to groups other than acidic —OH groups. These epoxides are referred to hereinafter as 1,2 epoxides.

Thus novel and valuable esters of halobutenyl alcohols have been produced according to this invention. Other novel esters having valuable properties may be prepared as will be apparent from the ensuing disclosure.

The reaction of the epoxide with the haloformate appears to proceed in accordance with the following equation:

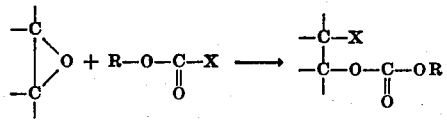

where R is the radical of the alcohol ROH, X is halogen such as chlorine or bromine and

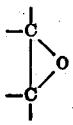

is the epoxy group of the epoxy compound. Various isomers of the halo esters are formed. Thus when butadiene monoxide (1,2 epoxybutene-3) is reacted with a haloformate such as ethyl chloroformate, mixtures of ethyl chloromethylvinylcarbinyl carbonate and ethyl 2-chloro-3-butenyl carbonate are produced.

The carbonate esters obtained in accordance with this invention usually are stable liquids which have relatively high boiling points. Many of these unsaturated esters polymerize in the presence of ultra violet light, peroxy polymerization catalysts such as benzoyl peroxide, lauroyl peroxide, acetone peroxide, or other oxygen polymerization catalyst such as oxygen, ozone, etc., to form solid polymers. This is especially true of the esters formed by reaction of an unsaturated epoxide with an unsaturated haloformate. Generally such polymers are less inflammable than most of the polymers of unsaturated carbonate esters. These esters also may be copolymerized with other unsaturated compounds such as styrene, vinyl acetate, vinyl chloride, methyl methacrylate, allyl or methallyl esters of polybasic or unsaturated acids such as diallyl phthalate, allyl methacrylate, ethylene glycol maleate, etc. The carbonate esters also may be used as intermediates for the production of other compounds. For example they may be chlorinated to produce high boiling liquid esters which may be used as plasticizers.

Saturated halo esters obtained by reaction of a saturated chloroformate with a saturated epoxide generally are high boiling liquids capable of use as plasticizers and heat exchange media.

The process herein contemplated may be performed by mixing the epoxide with the haloformate and permitting the reactants to interact. The rate of reaction is improved materially when catalysts such as pyridine, quinoline, isoquinoline, triisobutyl amine or other tertiary amine, aluminum chloride, ferric chloride, zinc-aluminum chloride mixtures and other Friedel-Craft catalysts, are used.

During the process, heat is evolved and where the reaction is conducted upon a substantial scale, cooling generally is necessary in order to prevent overheating. Usually the process is performed at temperatures of 0 to 125° C. Elevated temperatures, at least in the initial stages of reaction, usually are undesirable due to the tendency for chloroformates to decompose at such temperatures. Consequently the initial temperature of reaction usually is maintained below about 50° C. Solvents may be present if desired in order to facilitate contact of the reactants. For example, an initial content of the ester to be produced may be used as a mutual solvent for the reactants. Other solvents such as acetone, chloroform, benzene, toluene, xylene, etc., may be used if desired. The presence of large amounts of water is undesirable in view of the tendency of water to react with the reactants and reaction product. However small amounts of water do not appear to be harmful.

After reaction is complete, as evidenced by the fact that heat ceases to be evolved, the carbonate ester may be isolated by suitable means such as by fractionation.

The reaction of haloformates with 1,2 olefin oxides has been found to be general and is capable of application to numerous oxides. Thus alkylene epoxides such as ethylene oxide, propylene oxide, alpha butylene oxide or isobutylene oxide may be reacted with haloformates to form the corresponding Beta halo alkyl esters of carbonic acid. Other esters may be prepared by reacting haloformates with cycloaliphatic or aromatic epoxides such as styrene oxide, cyclopentene oxide or cyclohexene oxide or with substituted epoxides such as epichlorohydrin, glycidol, glycidol ethers or esters such as glycidol ethyl ether, glycidol allyl ether, etc.

The invention is particularly concerned with the esters which may be secured by reaction of haloformates with epoxides of diolefins such as butadiene monoxide, butadiene diepoxide, butadiene dimer epoxide (4-vinyl-1,2 epoxy cyclohexane) butadiene dimer diepoxide, chloroprene monoxide or isoprene monoxide or the epoxides of dimers and trimers of isoprene or chloroprene or of cyclopentadiene.

Carbonates of unsaturated halo alcohols are secured by reaction of haloformates of diene monoxides. Such unsaturated carbonates usually polymerize in the presence of ultra violet light ozone or peroxy catalysts such as benzoyl peroxide to form resinous products. When diepoxides of dienes such as butadiene diepoxide or butadiene dimer diepoxide are reacted with haloformates such as ethyl chloroformate, high boiling liquids which are dihydric alcohol-bis (monohydric alcohol carbonates) and which are useful as plasticizers for plastic compositions such as cellulose acetate, ethyl cellulose, polyvinyl chloride, polyvinylacetate, polystyrene, polyvinylidene chloride, etc.

The process may be carried out using numerous haloformates including aryl, alkyl, alkenyl and alkynyl haloformates such as the chloroformates of methanol, ethanol, isopropanol, isobutanol, n-propanol, octyl alcohol, lauryl alcohol, allyl alcohol, methallyl alcohol, 2 chloroallyl alcohol, crotyl alcohol, propargyl alcohol, benzyl alcohol or phenol. Moreover dichloroformates such as the dichloroformates of ethylene glycol, diethylene glycol, triethylene glycol, etc., may be reacted with the above 1,2 epoxy compounds.

The practice of the invention will be apparent from the following illustrative examples.

*Example 1*

Ethyl chloroformate, 54.3 grams, was placed in a three-neck flask, provided with a dry ice-acetone cooled reflux condenser. Forty two grams of 1,2-epoxybutene-3 was added slowly to the chloroformate at room temperature. During this addition very little reaction took place upon addition of 0.9 gram of pyridine to the mixture, a violent reaction occurred accompanied by vigorous refluxing and the temperature of the mixture rose to 85° C. After one hour the reaction mixture cooled to room temperature. This mixture was fractionated to recover the carbonate ester which is a mixture of mixed carbonate of ethyl alcohol and 2 chloro-3 butenol-1 having the probable structure $$CH_2=CH-CH-CH_2-O-C-O-CH_2-CH_3$$
$$\quad\quad\quad\quad | \quad\quad\quad\quad ||$$
$$\quad\quad\quad\quad Cl \quad\quad\quad\quad O$$

and the mixed carbonate of ethyl alcohol and 1-chloro-3 butenol-2 having the probable structure

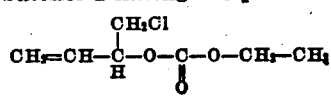

the former ester being predominant. This product is a liquid having a boiling point of 85–88° C. at 8 millimeters pressure and an index of refraction $n_D^{20}=1.4414$.

*Example 2*

Methyl chloroformate, pyridine and ethylene oxide were mixed in a reactor at 0° C. in the proportion of 9.5 grams of methyl chloroformate per 4.4 grams of ethylene oxide and 0.5 gram of pyridine, the pyridine being added to the mixture of chloroformate and epoxide. The reaction was provided with a reflux condenser cooled with a dry ice-acetone mixture. After the mixing was complete the mixture was allowed to stand at room temperature overnight. Thereafter the reaction mixture was fractionated and methyl 2-chloroethyl carbonate was obtained. This ester has the probable structure $$CH_3-O-C-OCH_2CH_2Cl$$
$$\quad\quad\quad ||$$
$$\quad\quad\quad O$$

This ester was a liquid distilling at 85–6° C. at 38 millimeters pressure and having an index of refraction $n_D^{20}=1.4275$.

*Example 3*

Diethylene glycol dichloroformate, 57.8 grams, was introduced into a three neck flask which was provided with a stirrer and a water cooled reflux condenser. 14.5 grams of propylene oxide was added to the diethylene glycol dichloroformate and then one cubic centimeter of pyridine was added and the mixture stirred vigorously. The temperature rose to 35–40° C. and the temperature of the mixture was maintained at this level by cooling using an ice bath. An additional 14.5 grams of propylene oxide was added and stirring was continued for four hours while maintaining the temperature of the mixture at 35–40° C. Heating was required for the last three hours to maintain this temperature. The mixture then was allowed to stand overnight and after standing was dissolved in 200 cubic centimeters of carbon tetrachloride, washed three times with dilute sulphuric acid to neutralize the pyridine and the neutralized product was fractionated and a water white liquid ester which is diethylene glycol bis (chloropropyl) carbonate was obtained. This ester distills at 200–210° C. at 3.5 millimeters pressure and has an index of refraction $n_D^{20}$ of 1.4612. Ethylene oxide may be used in lieu of propylene oxide and the same results obtained if pressure is maintained upon the reaction mixture to prevent escape of the ethylene oxide during the process.

*Example 4*

The process of Example 3 was repeated using 60.1 grams of styrene oxide, 54.3 grams of ethyl chloroformate and one cubic centimeter of pyridine, and stirring for three hours. Cooling was required for the first hour and heating for the last two hours in order to maintain the temperature at 35–40° C. Upon fractionation the carbonate ester was secured. This ester has the probable structure

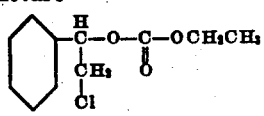

or

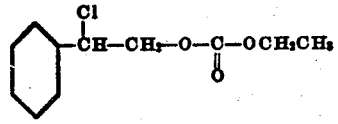

The ester is a water white liquid which boils at 135-140° C. at 4 millimeters pressure and which has an index of refraction $n_D^{20}$ of 1.5078.

Example 5

Epichlorohydrin 92.5 grams was reacted with 108.5 grams of ethyl chloroformate in the presence of two grams of pyridine in an apparatus of the type described in Example 3. Addition of the epichlorohydrin required about one hour. The mixture was stirred and was maintained at 45-55° C. during the addition and for five hours thereafter. Upon fractionation a colorless liquid carbonate ester, which is ethyl dichloropropyl carbonate was obtained. This ester boiled at 83-86° C. at 4 millimeters pressure and had an index of refraction $n_D^{20}$ of 1.4562.

The above described processes may be conducted using other haloformates such as the corresponding bromoformates to produce the corresponding bromo esters.

Although the present invention has been described with reference to the specific details of certain embodiments thereof it is not intended that such details shall be regarded as limitations upon the scope of the invention except insofar as included in the accompanying claims.

What is claimed:

1. A method of preparing a carbonate ester which comprises reacting a 1,2 epoxide with an ester of an haloformic acid.

2. A method of preparing a carbonate ester which comprises reacting a 1,2 epoxide with an ester of chloroformic acid.

3. A method of preparing a carbonate ester which comprises reacting an epoxide of butadiene with an ester of chloroformic acid.

4. A method of preparing a carbonate ester which comprises reacting butadiene monoxide with an ester of chloroformic acid.

5. A method of preparing a carbonate ester which comprises reacting an epoxide of a diolefin with an ester of chloroformic acid.

6. A method of preparing a carbonate ester which comprises reacting a diolefin monoxide with an ester of chloroformic acid.

ALPHONSE PECHUKAS.

REFERENCES CITED

The following references are of record in the file of this patent:

UNITED STATES PATENTS

| Number | Name | Date |
| --- | --- | --- |
| 2,370,571 | Muskat et al. | Feb. 27, 1945 |
| 2,370,589 | Strain et al. | Feb. 27, 1945 |
| 2,385,933 | Muskat et al. | Oct. 2, 1945 |
| 2,395,070 | Sarbach | Feb. 19, 1946 |

OTHER REFERENCES

Bedos, "Comptes rendus" (Paris), vol. 183, pp. 562-565 (1926).